United States Patent [19]

Burge

[11] Patent Number: 4,534,379
[45] Date of Patent: Aug. 13, 1985

[54] LOCKING FRAME FOR VALVES

[75] Inventor: Donald G. Burge, Plainwell, Mich.

[73] Assignee: Parker-Hannifin Corporation, Cleveland, Ohio

[21] Appl. No.: 596,977

[22] Filed: Apr. 5, 1984

[51] Int. Cl.³ .............................................. F16K 35/00
[52] U.S. Cl. ..................................... 137/385; 70/179; 70/180
[58] Field of Search ............... 251/102, 103, 104, 105, 251/106, 107, 288, 92, 93; 126/197; 70/177, 178, 179, 180; 137/382, 385

[56] References Cited

U.S. PATENT DOCUMENTS

| | | | |
|---|---|---|---|
| 724,912 | 4/1903 | Mobley | 70/179 |
| 961,959 | 6/1910 | Herfurth | 70/178 |
| 1,159,880 | 11/1915 | Tobin | 70/180 |
| 1,668,223 | 5/1928 | Utman | 137/382 |
| 1,993,784 | 3/1935 | Henderson | 70/180 |
| 2,979,076 | 4/1961 | Kish | 137/382 |
| 3,156,256 | 10/1964 | Weaver | 70/177 |
| 3,687,416 | 8/1972 | Mueller | 251/288 X |
| 3,865,130 | 2/1975 | Mullis | 251/288 X |
| 3,960,168 | 6/1976 | Plympton | 137/385 |
| 3,976,095 | 8/1976 | Koch et al. | 137/385 |
| 4,126,023 | 10/1978 | Smith et al. | 70/177 |
| 4,162,690 | 7/1979 | Anderson | 137/385 |
| 4,203,572 | 5/1980 | Coffman | 251/104 X |
| 4,380,247 | 4/1983 | Douglas | 137/382 |

*Primary Examiner*—Samuel Scott
*Assistant Examiner*—Carl D. Price
*Attorney, Agent, or Firm*—Joseph B. Balazs

[57] ABSTRACT

A locking frame for a ball valve consists of a sheet metal stamping folded into an enclosure having upper and lower plates to partially surround a part of the operating handle and the nut which secures the handle. The handle is keyed to the valve stem and engages body flanges to limit travel to valve open and valve closed positions. The frame is also fitted over the valve stem and includes tabs which engage the flanges to position same and to prevent rotation thereof. The upper plate is folded to a position parallel to the lower plate after assembly and includes a depending tab to further enclose the nut to prevent tampering. A pair of holes in the upper and lower plates are thus in registry and the shackle of a padlock may be passed therethrough to prevent movement of the handle from the valve open and valve closed positions.

3 Claims, 4 Drawing Figures

LOCKING FRAME FOR VALVES

BACKGROUND OF THE INVENTION

This invention relates to valves for controlling the flow of fluid and more particularly to a locking device for use in association with such valves and with a ball valve in particular.

Locking devices are well known in the field of fluid valves and are employed as safety devices for preventing unauthorized or inadvertent operation of the valve. Many of these locking devices employ a padlock which includes a shackle which is passed through a portion of the valve or a device fixed to the valve for preventing movement of the valve operator. Typically, an inexpensive sheet metal device is fabricated and joined to the valve, and located so as to be adjacent the path of travel of the valve operator or to cooperate with the valve operator, so that when a padlock is attached thereto, some movement of the valve operator is prevented. In the ball type of valve, typically the valve operator is a handle consisting of a lever which is swung through an arc of about ninety degrees, between a valve open position parallel to the axis of the valve and a valve closed position transverse thereto. Various devices have been employed in the past to lock the handle in one or both of its extreme positions, but these devices are cumbersome, unwieldy, expensive, insufficiently secure, or difficult to manufacture, assembly or utilize and thus have not provided a completely satisfactory solution.

SUMMARY OF THE INVENTION

This invention is an improvement over such prior art devices and provides a simplified, reliable, inexpensive structure for locking the handle of a ball valve, for example, in either its closed or open position.

The locking device is formed from sheet metal, bent into substantially parallel upper and lower plates in a u-shaped configuration. The plates have aligned apertures therein positioned between the open and closed position of the ball valve operating handle. When the shackle of a padlock is passed through the apertures, the handle is prevented from movement from either the open or closed position.

The frame of the locking device is arranged to be mounted on the boss of the valve which journals the valve stem rotated by the handle and includes depending tabs which engage flanges on the valve body to position the frame and prevent rotation thereof. The frame is affixed to the valve body through an aperture in the lower plate and is secured by the conventional stem nut. Thereafter, the upper plate is folded to a substantially parallel position over the nut to bring the padlock apertures into registry and to partially enclose the nut. Another depending tab on the upper plate serves to further encompass the nut to prevent tampering therewith.

DESCRIPTION OF THE INVENTION

Figure 1:
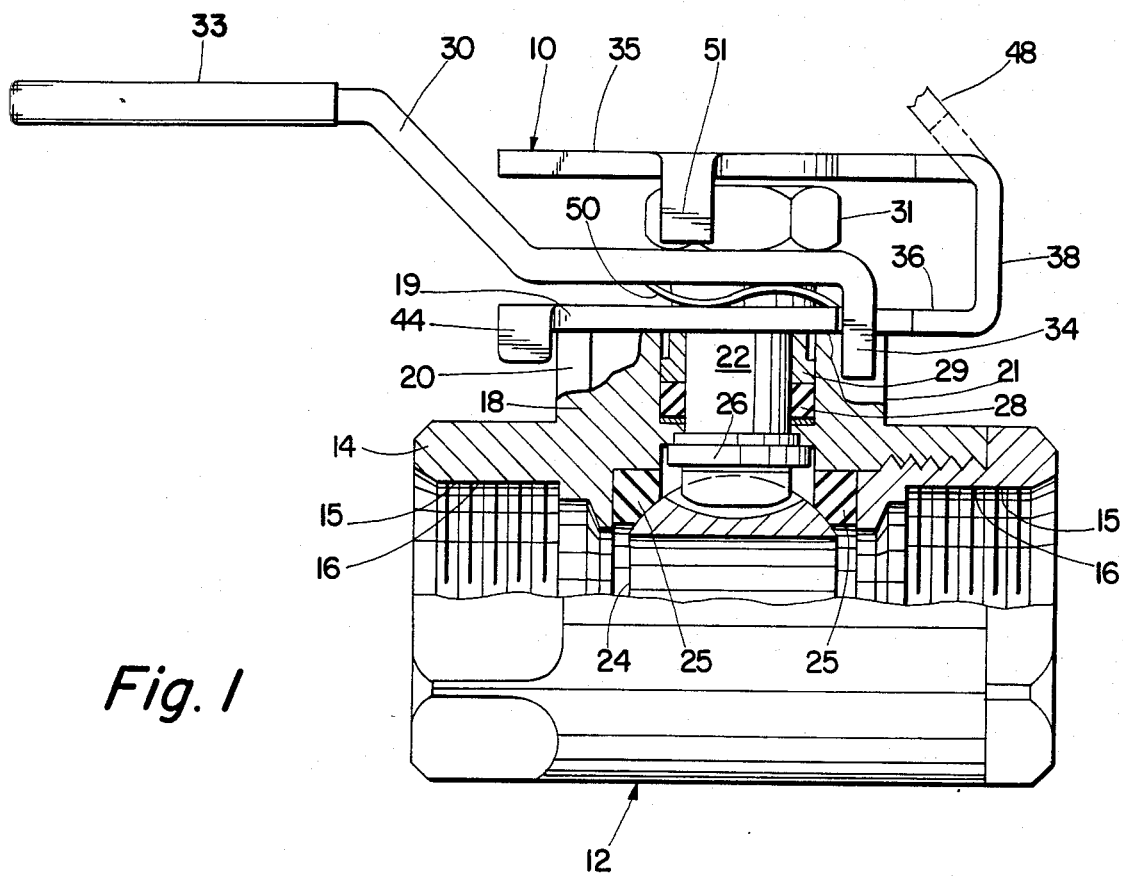
FIG. 1 is a side view of the locking frame of the invention applied to a ball valve with portions thereof shown partially in cross section.
Figure 2:
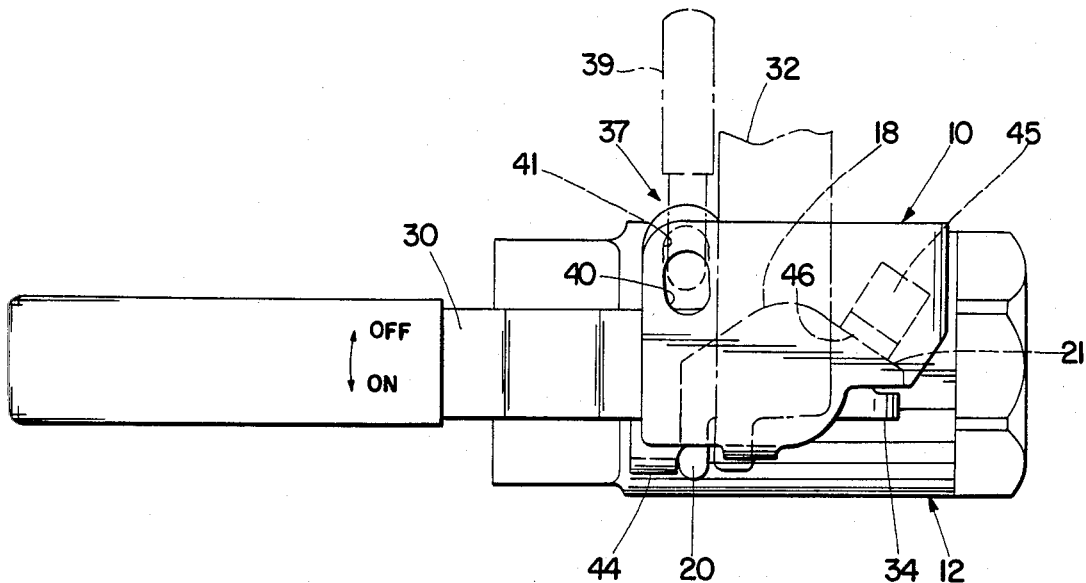
FIG. 2 is a top view of the locking frame and ball valve of FIG. 1, showing the valve handle in the open position in solid lines and in the closed position in phantom lines.
Figure 3:
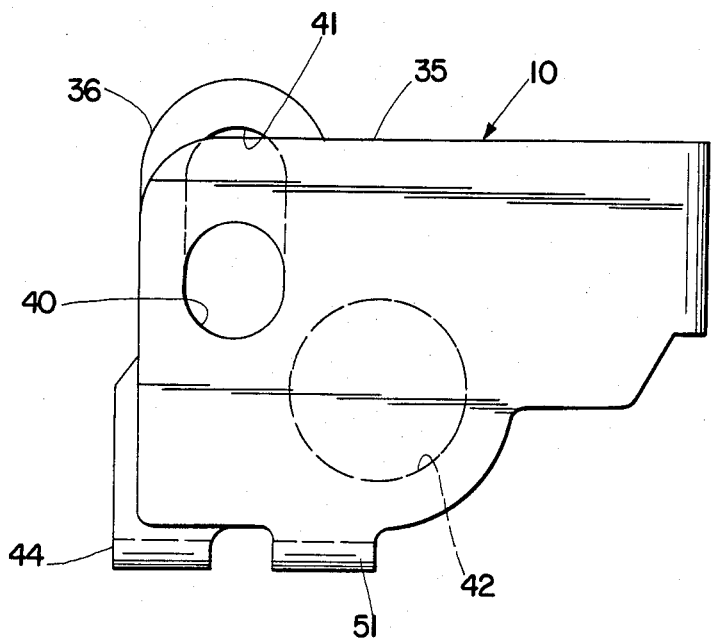
FIG. 3 is a top view of the locking frame removed from the ball valve.
Figure 4:
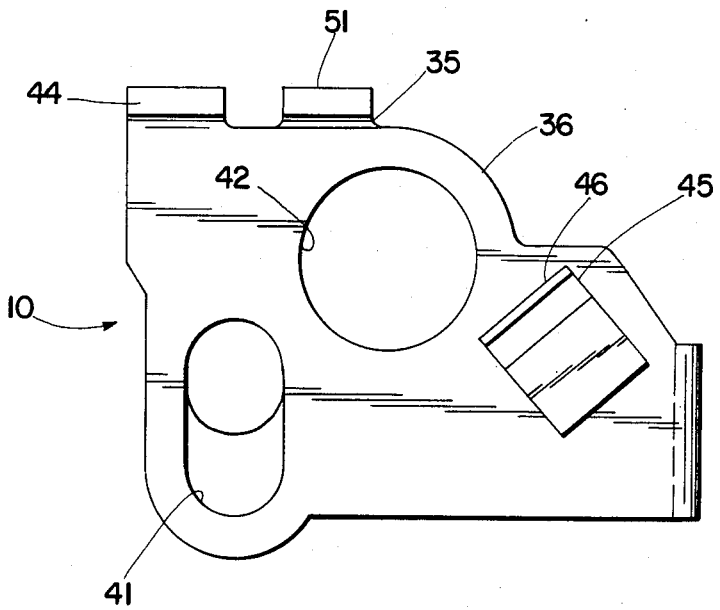
FIG. 4 is a bottom view of the locking frame removed from the ball valve.

Referring now to the drawings, locking frame 10 of the invention is shown applied to ball valve 12 in FIGS. 1 and 2 and removed therefrom for clarity in FIGS. 3 and 4.

Ball valve 12 is a conventional fluid valve used as an example to demonstrate the advantages of this invention and comprises body member 14 having inlet and outlet ports 15 and throughbore 16 generally along a longitudinal axis. A central boss 18 projects upwardly from body 14 and includes flat upper surface 19, transverse stop flange 20 and generally axially protruding stop flange 21, all integrally formed together with body 14 in a common casting.

Boss 18 is bored and rotatably receives cylindrical valve stem 22 which engages ball valve 24 by means of a conventional key and slot interconnection for rotation of valve 24 between open and closed positions. Ball valve 24 includes a throughbore and is received in annular seals 25 for control of fluid between inlet and outlet ports 15. Valve stem 22 is retained in body 14 by means of lower peripheral flange 26 and is sealed in boss 18 by means of stem packing 28 and packing gland 29. Gland 29 is a collar which is slidably received in the bore of boss 18 over packing 28 and protrudes slightly above upper surface 19 to provide a device for locating and support of frame 10. Valve stem 22 is keyed at its upper end to receive operating lever or handle 30 in a relatively non-rotatable interconnection and is further threaded to receive nut 31 for securing handle 30. Thus, it may be seen that handle 30 is affixed to valve stem 22 by the keyed interconnection therebetween and is secured thereon between nut 31 and gland 29. Handle 30 is rotatable relative to body member 14 from the open position of the valve as seen in solid lines in FIG. 2 to the closed position shown in phantom lines 32. Handle 30 includes grasping portion 33 at one end and downwardly disposed tang 34 at the other end thereof which serves to limit the rotatable movement of handle 30 and thus ball valve 24. In the open position of the valve, tang 34 is limited by engagement with axially extending stop flange 21 and in the closed position by transversely extending stop flange 20.

Locking frame 10 is formed from a sheet metal stamping and is eventually folded to the position best depicted in FIG. 1 as including substantially parallel upper plate 35, lower plate 36 and vertically extending, intermediate bend portion 38. Plates 35, 36 are generally of the same outline configuration so that when disposed above one another are generally matching, each being generally in the shape of a rectangle, although recessed at one corner to provide clearance for movement of handle tang 34 when rotated between open and closed positions. At the diagonally opposite corners from the recess are holes 40, 41 in upper and lower plates 35, 36, respectively which are provided for receipt of the shackle of a padlock 39. Holes 40, 41 are in registry or in vertical alignment with one another and lower plate hole 41 is elongated so as to assure such registry after folding of the plates 35, 36 is completed. Holes 40, 41 in locking frame 10 are thus in a single location, identified by numeral 37, adjacent handle 30 and between the valve open and valve closed positions of handle 30.

As seen more clearly in the bottom view of FIG. 4, bottom plate 36 includes generally central aperture 42 and downwardly directed tab 44 at one of the corners thereof. A further downwardly directed tab 45 is welded to the bottom surface of plate 36. Tab 45 is a bent rectangle of sheet metal, providing a weld surface to be attached to plate 36 and a free end 46 spaced slightly below the surface of plate 36. Aperture 42 is sized to be a sliding fit over collar 27 so that when plate 36 is placed over collar 27, plate 36 will lie against upper surface 19 of boss 18 and be provisionally located thereon. As best seen in FIG. 1, tab 44 is positioned to abut transverse flange 20 of body number 14 while free end 46 of tab 45 is positioned to lie against the angled surface forming a part of axially extending flange 21 thereby securely and uniquely positioning locking frame 10 on boss 18. Alternatively, tab 45 could be formed by punching through the bottom surface of plate 36 and bending same to the angular disposition shown.

When locking frame 10 is initially positioned on body member 14, upper plate 35 is provisionally disposed in the position indicated by dashed lines 48 in FIG. 1 in order to allow assembly of the handle 30. In this position upper plate 48 extends upwardly at about a 45 degree angle from bend portion 38. After lower plate 36 is initially positioned on surface 19 as described above, circular wave spring 50 is placed thereon and about gland 29, followed by handle 30 and nut 31. The latter may be tightened until handle 30 is firmly pressed against gland 29, wave spring 50 being thereby compressed to urge and retain lower plate 36 against upper surface 19 of boss 18. Thereafter, upper plate 35 may be bent to the position shown in solid lines in FIG. 1 by suitable power equipment to bring upper hole 40 into registry with lower hole 41 and to cover nut 31. Other types of spring devices, such as lock washers or a plain washer (possibly plastic) could be used in place of wave spring 50. A tab 51 depends from upper plate 35 to a location slightly above handle 30, to further enclose nut 31 and prevent tampering therewith. Locking frame 10 is preferably formed of sheet metal of substantial thickness as to require substantial force to bend same to the position depicted, thereby further resisting tampering effects. When the shackle of a padlock is passed through holes 40, 41 this will also serve to enclose nut 31 and further will prevent unbending of locking frame 10.

As best seen in FIG. 2 the shackle of a padlock through holes 40, 41 will lie between the open and closed positions of handle 30 and will prevent movement of the handle therebetween. In all other instances however, ball valve 12 will retain its usual operating mode, entirely unaffected by the presence of locking frame 10. While a padlock is indicated as a security mechanism, it is apparent that other devices would serve as well. Thus, for example, a pin could be passed through holes 40, 41 to prevent movement of handle 30 or locking frame 10 could be modified so that other locking devices could be selectively applied to the frame at the single location 37 to interfere with movement of handle 30 between the open and closed positions.

I claim:

1. A fluid valve with a handle locking device, comprising:
    a body having a bore therein for flow of fluid,
    an upstanding boss on said body,
    a shaft journaled in said boss, said shaft being operatively coupled to a valve disposed in said body for controlling the flow of fluid through said bore,
    a handle keyed on said shaft for rotating said shaft between valve open and valve closed positions, said handle being elongated having a depending tang at one end and a grasping portion at the other end,
    a nut securing said handle to said shaft,
    a spring disposed around said shaft urging said handle against said nut,
    a first stop flange on said body for limiting rotatable movement of said shaft at a valve open position,
    a second stop flange on said body for limiting rotatable movement of said shaft at a valve closed position,
    said tang on said handle being disposed between said flanges and rotatable with said handle into engagement with said stop flanges, and
    a U-shaped frame fixed to said body and extending to a single location adjacent said handle and between the valve open and valve closed positions of said handle, said frame comprising substantially parallel upper and lower plates and having an interconnecting bend portion, said nut positioned between said upper and lower plates, said lower plate having an aperture receiving said shaft and being supported on said body boss between said boss and said spring, first and second depending tabs on said lower plate adapted to engage respectively said first and second stop flanges to prevent rotation of said frame, each said upper and lower plate having a hole therein at said single location, said holes being in alignment and adapted for receipt of a device at said single location for selectively preventing rotation of said handle from the valve open and valve closed positions.

2. A fluid valve as set forth in claim 1 further including a third depending tab on said frame disposed adjacent said nut, which together with said upper and lower plates and said interconnecting bend portion of said frame serves to substantially enclose said nut to prevent access thereto.

3. A fluid valve as set forth in claim 2 wherein said frame is a sheet metal stamping and said tabs are bends therein transverse to the planes of said upper and lower plates.

* * * * *